(12) United States Patent
Carroll

(10) Patent No.: US 6,351,402 B1
(45) Date of Patent: Feb. 26, 2002

(54) AC ADAPTER WITH CURRENT DRIVEN, ZERO-VOLTAGE SWITCHED SYNCHRONOUS RECTIFIER

(75) Inventor: Barry N. Carroll, The Woodlands, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/675,482

(22) Filed: Sep. 29, 2000

(51) Int. Cl.[7] .................. H02H 7/125; H02M 5/42; H02M 7/04
(52) U.S. Cl. ..................... 363/125; 363/53; 363/89
(58) Field of Search .................. 363/52, 53, 84, 363/89, 125, 127

(56) References Cited

PUBLICATIONS

Code of Conduct on Efficiency of External Power Supplies, P. Bertoldi, European Commission, Brussels, Dec. 22, 1999, XVII/C/1–PB//pb D(99) (4 p.).
Low–Power BiCMOS Current–Mode PWM, Unitrode, 1999, Texas Instruments Inc. (pp. 1–8) No Month.

Primary Examiner—Bao Q. Vu
(74) Attorney, Agent, or Firm—Conley, Rose & Tayon, P.C.

(57) ABSTRACT

A rectifier comprising a current transformer configured to receive a bipolar signal. The current transformer is comprised of a primary coil and preferably two secondary coils with opposite polarities. The rectifier also includes a rectifying transistor coupled to one of the secondary coils in the current transformer. Positive current from the first secondary coil causes the transistor to turn on thereby allowing current to flow through the transistor from the input of the rectifier to the output of the rectifier. A pull-down transistor is coupled to a second secondary coil of the current transformer. Positive current from the second secondary coil causes the pull-down transistor to turn on. The pull-down transistor is configured to connect the control terminal of the rectifying transistor to ground, thereby turning the rectifying transistor off, when the pull-down transistor is turned on. The rectifier further comprises a diode coupled to each of the two secondary coils to allow only positive current flow through the secondary coils. The rectifier further comprises a capacitor coupled in parallel with the control terminal of the pull-down transistor which delays switching of the rectifying transistor, thereby permitting zero voltage switching of the rectifying transistor. The rectifier further comprises a hold-down transistor configured to ground the control terminal of the pull-down transistor, thereby holding the pull-down transistor off, when the rectifying transistor is on. Zener diodes are placed in parallel with the control terminals of the pull-down and rectifying transistors to regulate voltage and prevent damage to the transistors.

17 Claims, 8 Drawing Sheets

AC ADAPTER WITH CURRENT DRIVEN, ZERO-VOLTAGE SWITCHED SYNCHRONOUS RECTIFIER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Field of the Invention

The present invention generally relates to alternating current voltage rectifiers. More specifically, it relates to a method and apparatus for rectifying a bipolar voltage signal using a current driven, zero-voltage switched, synchronous rectifier.

2. Related Art

Alternating Current (AC) adapters used in supplying power to electronic devices accomplish several tasks. First, and perhaps most importantly, these adapters transform voltage from a high level (e.g., 120V) to a lower, usable level (e.g., 3V, 6V, 12V, 24V). Second, these adapters convert alternating current into direct current (DC). In many cases, small portable electronic devices are designed to operate using a direct current (DC) voltage source. The transformation of a high voltage AC signal to a lower voltage DC signal allows these devices to use power from standard wall outlets. AC adapters generally include a transformer to reduce the voltage level and a rectifier to convert AC signals to DC signals.

Many portable electronic devices are configured to operate under battery power and alternatively under power from an AC adapter. In many of these designs, the output voltage from the AC adapter is used to not only power the electronic device, but also to recharge batteries. In fact, many devices today allow for fast recharging of batteries even while the device is operating. As a result, AC adapters are increasingly subjected to heavy power demands.

The rectification performed by an AC adapter involves the conversion of bipolar (alternately positive and negative) signals into unipolar (never negative) signals. Conventional rectifiers generally use diodes or voltage driven power transistors to perform the rectification. In both cases, increased power requirements have led to increased power dissipation in the rectifying components of the AC adapter.

In conventional AC adapters that use diodes to rectify the voltage, some of the most widely used diodes are PN junction diodes and Schottky diodes. PN junction diodes are minority carrier devices which operate on the principle that a forward-biased diode will permit current flow via minority carrier diffusion, yet will largely prevent current flow (up to a breakdown point) under reverse-bias because carriers are unable to traverse the transition region between the p and n regions. Power dissipation may be a problem with using a PN junction as a rectifier. As a voltage signal goes negative, the diode must dissipate the stored charge that develops during forward-bias. This stored charge is in the form of excess minority carriers which must be depleted by recombination within the diode and by reverse current flowing out of the diode. Ultra-fast recovery PN junction diode designs may be used to help alleviate some of the switching delays and power losses associated with the recombination process.

However, in some of the more power-demanding applications, such as portable computers, the AC adapter must provide upwards of 15 to 30 volts DC to the unit. These increased voltage demands require the use of higher voltage capacity diodes. These higher voltage diodes require thicker junction regions, that lead to higher resistivity, a higher volume of stored charge, and a longer recombination time.

Schottky diodes have been used in an effort to alleviate some of the problems associated with using PN junction diodes as rectifiers. Schottky diodes are manufactured with a metal deposited on a semiconductor material. The metal has a larger work function than the semiconductor material on which it is deposited that creates an energy barrier to current carriers attempting to cross the junction between the materials. The energy barrier height is reduced in forward bias thereby allowing majority carriers to cross the junction between the two surfaces and to create a current flow. In reverse bias, the barrier height is increased, and current flow is limited. The key difference between Schottky diodes and PN junction diodes is that the former rely on majority carriers to create current flow while the latter depends on minority carriers for current flow. Since the Schottky diode does not require recombination of minority carriers during transitions from forward to reverse current flow, switching times and switching losses are reduced. Schottky diodes also offer the advantage of providing lower conduction losses than a PN junction diode. Despite these advantages, Schottky diodes inherently exhibit a substantially higher junction capacitance which adversely affects reverse recovery characteristics. In some cases, this capacitance may yield losses on the order of those seen in PN junction diode rectifiers.

Another device commonly used in AC voltage rectifier applications is the power MOSFET (metal-oxide-semiconductor field effect transistor). Like the Schottky diodes, MOSFETs are majority carrier devices. MOSFET transistors also exhibit fast switching speeds and reduced conduction losses. The increased switching speed decreases losses due to reverse current flow in the rectifier. The net result is that power dissipation may be lowered when a MOSFET is used as a rectifier. Some conventional systems use an integrated circuit (IC) to switch the MOSFETs. This aids in controlling the timing of the rectifier circuit, but adds significantly to the complexity. Other conventional AC adapters that use MOSFET switching devices are voltage driven from the primary side of the main voltage transformer. This type of design is inherently inefficient because the switch control signals are delivered across the transformer, which induces delays in the pulse waveforms. The problem is exacerbated by safety requirements for transformers which call for insulation between transformer windings. This separation results in poor coupling and increased leakage inductance in the transformer. In all these cases, a problem with using MOSFETs as voltage rectifiers occurs during light- to no-load conditions, where their switching losses dominate the power loss in the AC adapter.

Requests to promote efficiency improvements of electrical end-use equipment have been promulgated by the Directorate General for Energy (DG-Energy) of the European Commission. These requests include the improvement of no-load efficiency. The "Code of Conduct on Efficiency of External Power Supplies" has set forth a requirement that no-load AC adapter power consumption be restricted to less than 1 Watt by the year 2001. Stricter requirements are requested for subsequent years. The requirements of the Code of Conduct are well known to those skilled in the art and are herein incorporated by reference.

It is desirable therefore, to develop an AC adapter that reduces the no-load power consumption to conform to the European Commission Code of Conduct while offering better efficiency and thermal performance at rated load current. The improved efficiency of the AC adapter may advantageously reduce power consumption and reduce heat dissipation. Furthermore, the AC adapter output rectifier would preferably be self-driven from the secondary side of the transformer so as to decrease device complexity and improve rectifier synchronization. As a result of these benefits, the size of the AC adapter may advantageously be reduced.

SUMMARY

The problems noted above are solved in large part by an output rectifier circuit for an AC adapter comprising a current transformer configured to receive and rectify a bipolar signal. The current transformer and the rest of the rectifier circuitry are located on the secondary (load) side of the main transformer. The load current is used to drive the current transformer. The current transformer is comprised of a primary coil and preferably two secondary coils with opposite polarities. A diode is coupled to each of the two secondary coils to allow only positive current flow through the secondary coils. Since the polarities of the secondary coils are opposite one another, current will generally flow through one diode or the other at a given time. The rectifier also includes a rectifying transistor coupled to one of the secondary coils in the current transformer. Positive current from the first secondary coil causes the rectifying transistor to turn on thereby allowing current to flow through the transistor from the input of the rectifier to the output of the rectifier. A pull-down transistor is coupled to the second secondary coil of the current transformer. Positive current from the second secondary coil causes the pull-down transistor to turn on. The pull-down transistor is configured to connect the gate of the rectifying transistor to ground (thereby turning the rectifying transistor off) when the pull-down transistor is turned on. Switching losses inherent in a transistor switched rectifier are reduced by including a capacitor coupled in parallel with the gate of the pull-down transistor which delays switching of the rectifying transistor, thereby permitting zero voltage switching of the rectifying transistor. Zero voltage switching implies that the voltage and current in the switching transistor are not both positive at the same time. The rectifier further comprises a hold-down transistor configured to ground the gate terminal of the pull-down transistor, thereby holding the pull-down transistor off, when the rectifying transistor is on. The hold-down transistor keeps the pull-down transistor from inadvertently turning on (and thereby turning the rectifying transistor off) when the rectifying transistor should be on. Zener diodes are placed in parallel with the gate terminals of the pull-down and rectifying transistors to regulate voltage and prevent damage to the transistors. The above described features of the rectifier improve electrical and thermal efficiency of the AC adapter and may advantageously permit a reduction in the overall size of the AC adapter.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
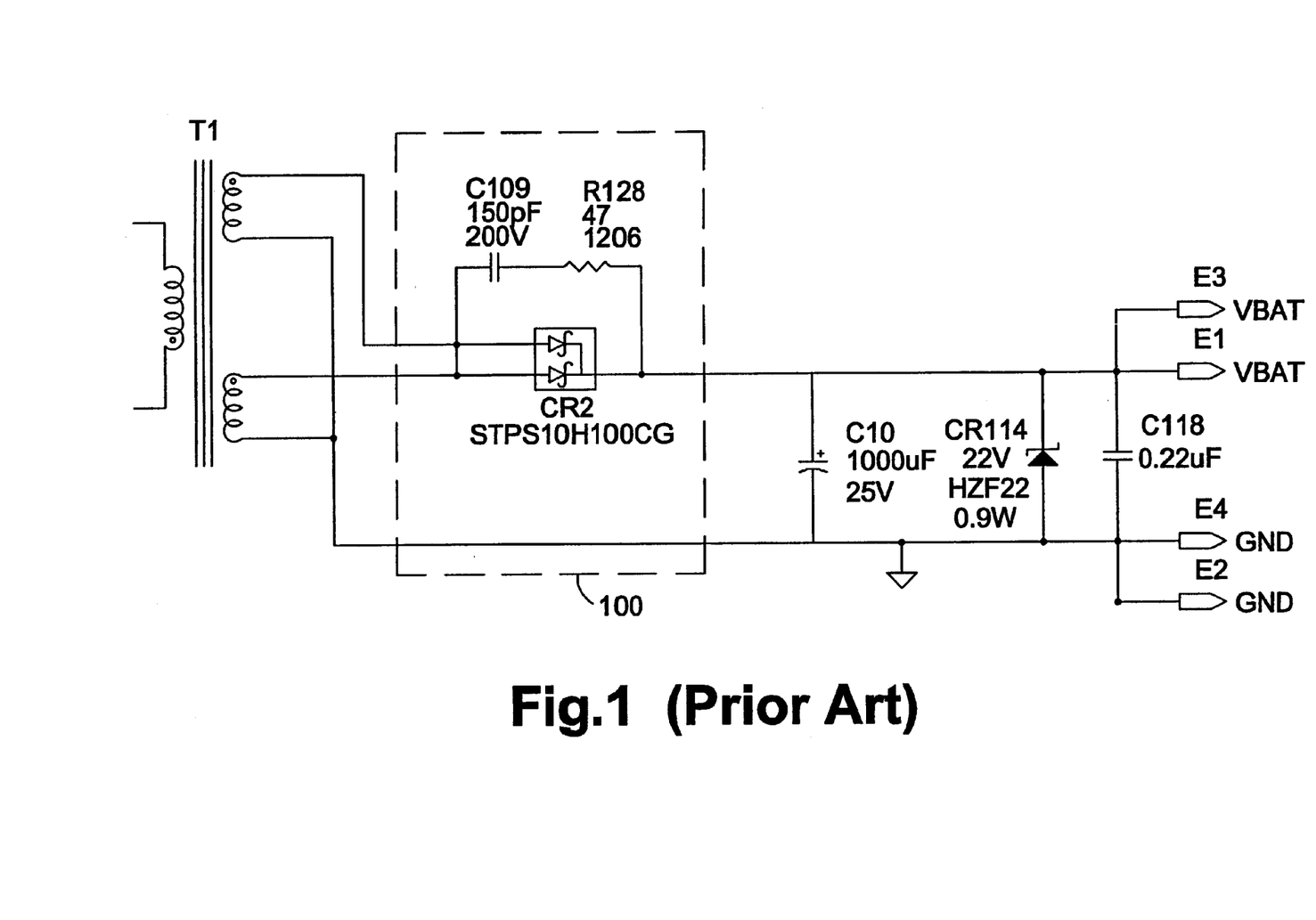
FIG. 1 shows a schematic of a conventional AC adapter output stage comprising Schottky-diode rectifiers.

Referring now to the figures, FIG. 1 shows a conventional Schottky diode embodiment of an AC adapter output stage. It includes a transformer T1, a rectifier 100, and an output capacitor C10. The transformer illustratively includes a primary winding that carries an alternating signal that will be described further below, and secondary windings connected in parallel. The rectifier 100 is coupled to the parallel secondary windings of voltage transformer T1 in such a way that the bipolar voltage signal from the transformer T1 is rectified and filtered to ideally provide a constant DC voltage output.

Rectifier 100 includes a Schottky diode package CR2, a snubber network comprised of capacitor C109, and a dampening resistor R128. The snubber capacitor and resistor are coupled in series, and the series combination is coupled in parallel with the Schottky diode package. As the Schottky diodes rectify the transformer signals, the snubber capacitor and resistor provide high-frequency snubber protection of the diode package CR2. Output capacitor C10 filters the rectified current to provide an output DC voltage signal. Zener diode CR114 provides over-voltage protection to the electronic device and capacitor C118 provides high frequency de-coupling before the output voltage is transmitted to the electronic device via terminals E1 through E4.

Figure 2:
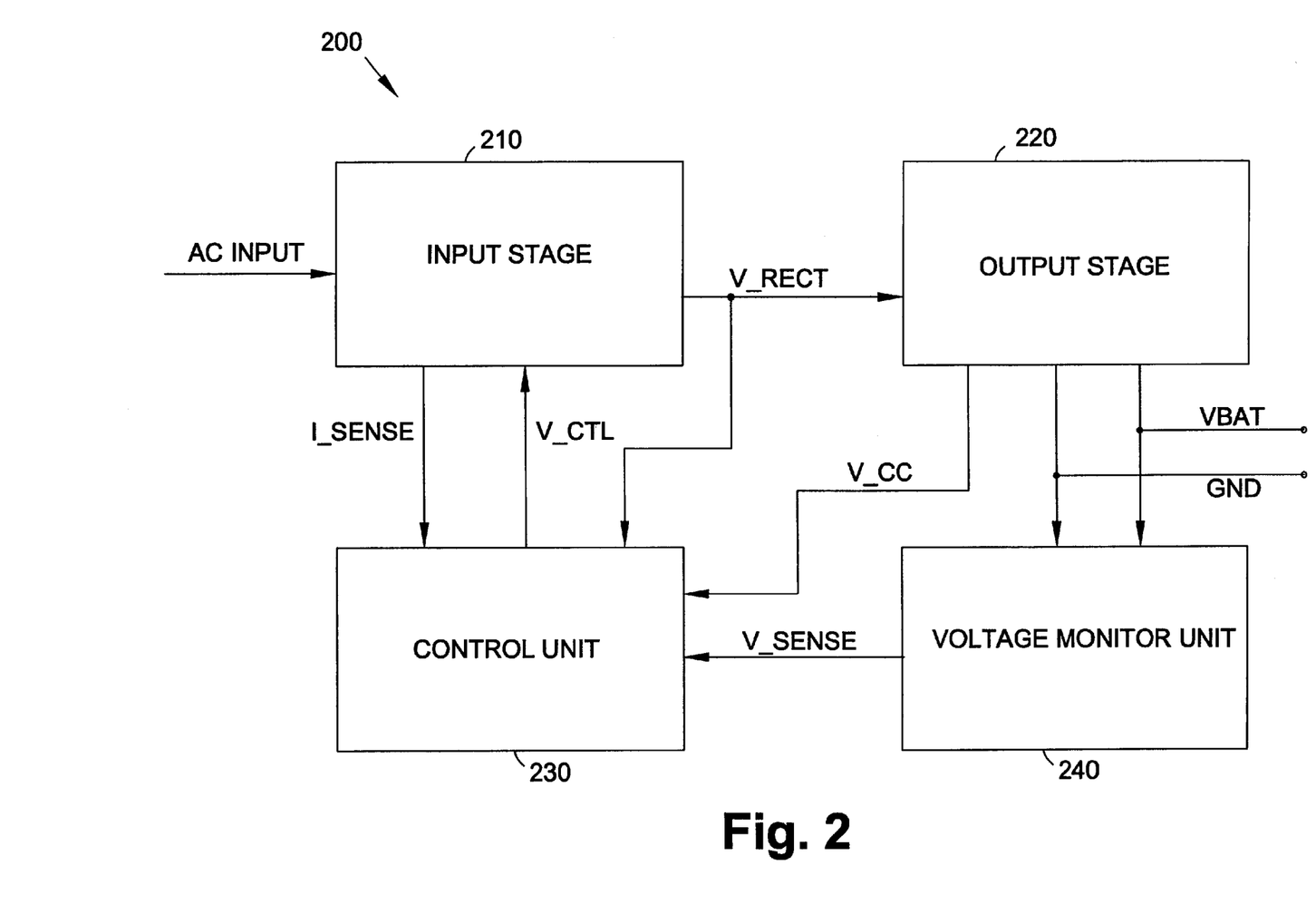
FIG. 2 shows a block diagram of an AC adapter configurable for use with the preferred embodiment.

FIG. 2 shows a block diagram of an AC Adapter 200. The AC Adapter 200 is comprised of four separate sub-components: an input stage 210, an output stage 220, a control unit 230 and a load monitor unit 240. The input stage 210 generally accepts a high voltage, AC signal and performs a preliminary filtering and rectifying of this signal. The partially rectified voltage V_RECT is transmitted to the output stage 220 where the voltage is transformed to a usable voltage level and rectified and filtered for output (VBAT) to an electronic device. The AC adapter further comprises a voltage monitor unit 240 that senses voltage at the output stage 220 and sends a feedback signal (V_SENSE) to the control unit 230. The control unit 230 preferably comprises circuitry configured to detect when the AC adapter is in use and also to detect changes in the output load and adjust the average power level of the voltage signal V_RECT sent to the output stage 220. The power level is adjusted by varying the pulse width of V_RECT as required. As load requirements increase, the control unit 230 is preferably configured to transmit a control signal V_CTL to the input stage 210 which adjusts the pulse width accordingly. Power for the circuitry in the control unit 230 is provided by the output stage as a voltage signal V_CC.

Figure 2A:
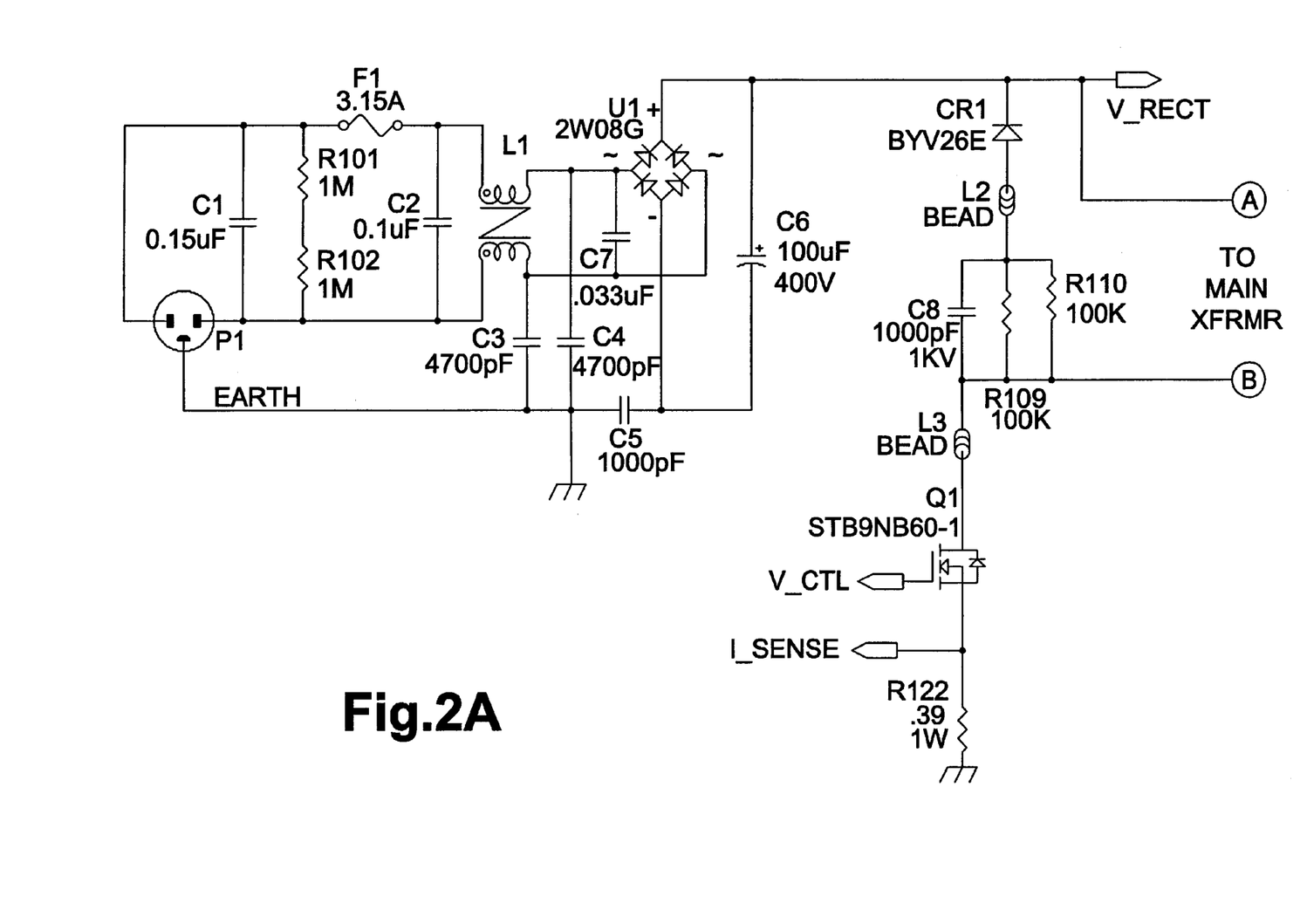
FIGS. 2A through 2D show a schematic diagram of the AC adapter of FIG. 2.
Figure 2B:
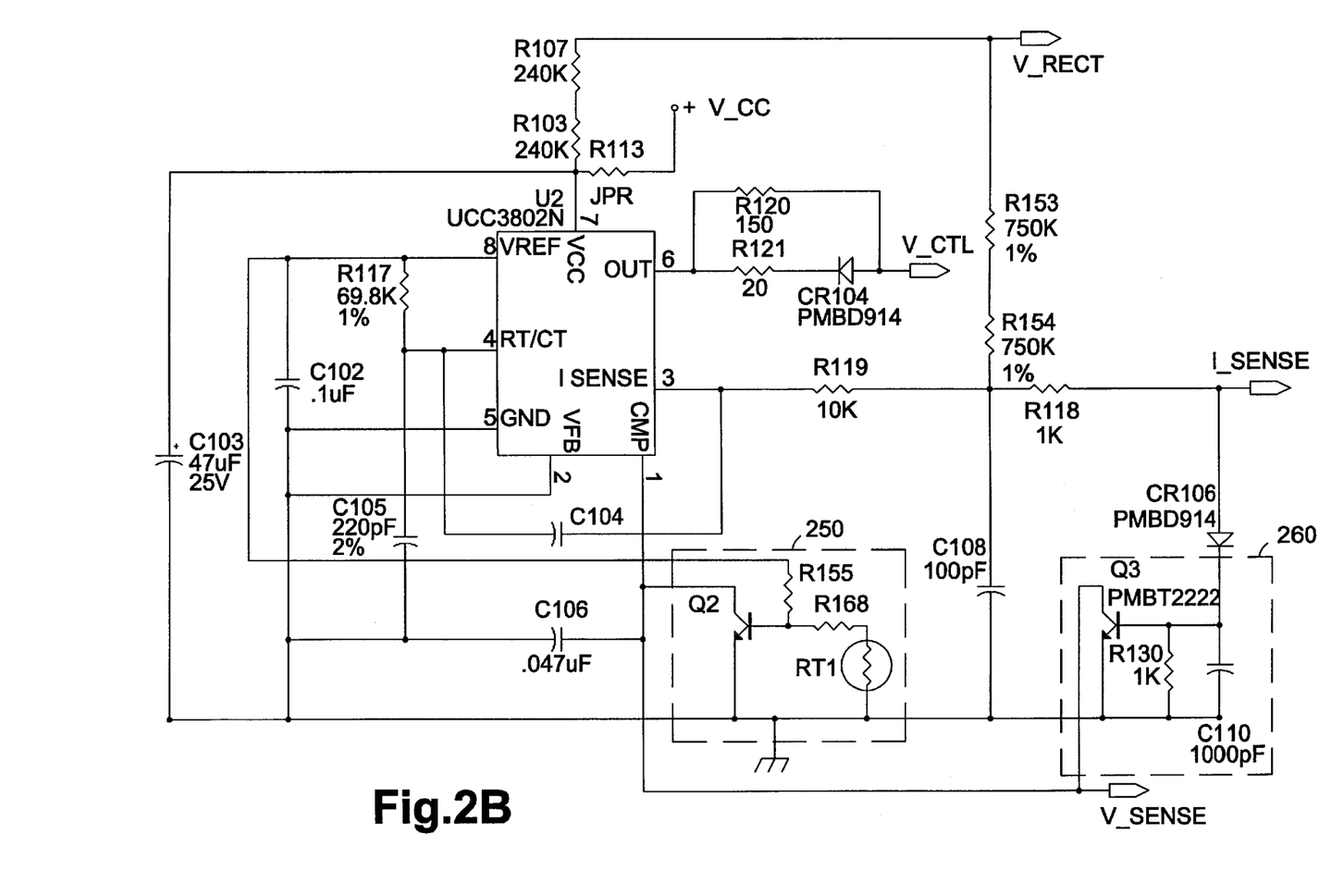
Figure 2C:
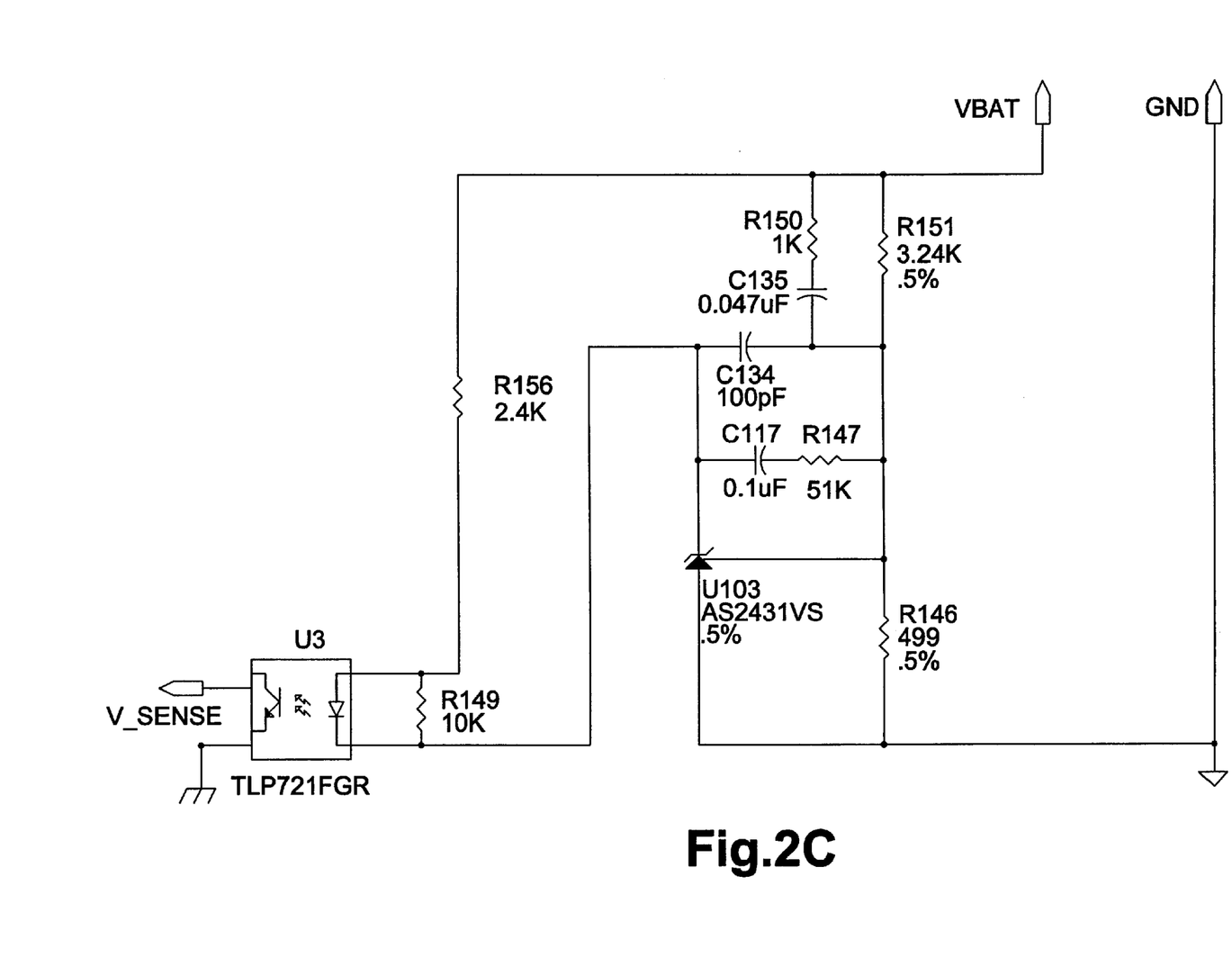
Figure 2D:
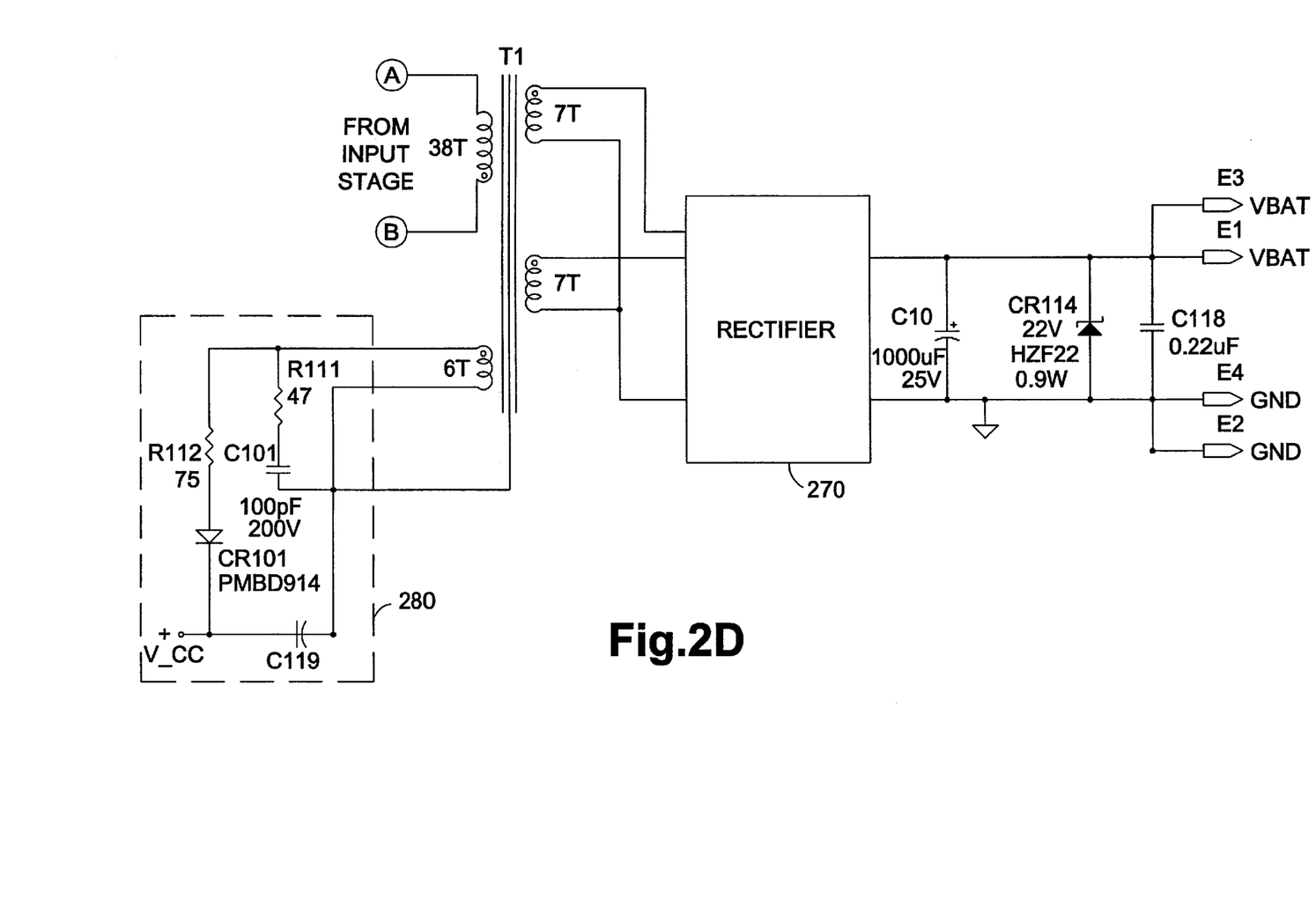

Subfigures 2A, 2B, 2C, and 2D show the complete, preferred schematic diagram of an AC adapter 200 configured to convert AC voltage from an external source such as a wall outlet, to a fixed DC voltage for use in powering a portable electronic device such as a portable computer. FIG. 2A represents the input stage 210 and FIG. 2B represents the control unit 230 from FIG. 2. Similarly, FIGS. 2C and 2D represent the voltage monitor unit 240 and output stage 220, respectively, from FIG. 2.

Referring to FIG. 2A, the source voltage is provided via connector P1 which may preferably be a wall outlet plug. The voltage entering the AC adapter is initially converted to high voltage DC by a bridge rectifier U1 and filter capacitor C6. The bridge rectifier U1 effectively doubles the frequency of the incoming AC signal and capacitor C6 eliminates much of the ripple in the resulting signal. The input stage 210 also preferably includes a main switch transistor Q1. Transistor Q1 is turned on and off by control signal V_CTL which is generated by the control unit 230 (See also FIG. 2B). When transistor Q1 is on, the partially rectified voltage V_RECT appears as a bipolar quasi-square wave voltage across the primary windings of the main transformer. When Q1 is turned off, the return current flow path from the main transformer is dissipated through a clamp network made up of CR1, L2, L3, C8, R109 and R110 to limit the maximum voltage across Q1. As the current is dissipated, the voltage on the secondary coil has a maximum value. As the current in the primary winding reaches zero, the current in the secondary coil begins to increase. The frequency with which Q1 turns on and off is fixed.

The duration for which the main switch transistor Q1 stays on is determined by the control unit 230. The preferred embodiment of the control unit 230 is shown in the schematic of FIG. 2B. The control unit 230 comprises a current-mode pulse width modulator (PWM) integrated circuit (IC) U2 (shown in FIG. 2B) which drives the main switch transistor Q1 based on load and source voltage conditions. The PWM IC detects load and source voltage conditions as transmitted by the voltage monitor unit 240 (see FIG. 2C) and varies the duty cycle of the voltage signal delivered to transformer T1 by switching the main switch Q1 on and off (via V_CTL) as dictated by V_SENSE. The voltage sense signal V_SENSE may be short circuited in a couple different situations. A temperature sense circuit 250 includes a thermistor RT1 and transistor Q2 that are configured to ground the voltage sense signal V_SENSE if the temperature in the AC Adapter 200 reaches a predetermined temperature. Similarly, an over-current sense circuit 260 is configured to turn on transistor Q3 and ground the voltage sense signal V_SENSE if I_SENSE is above a predetermined threshold. If either transistor Q2 or Q3 are on and V_SENSE is grounded, the PWM IC U2 will force the duty cycle of the control signal V_CTL to zero thereby reducing the power output of the AC Adapter 200. Otherwise, as load requirements increase, the duty cycle of the control signal V_CTL acts to keep the main switch transistor Q1 on longer and thereby deliver more power to the output of the AC Adapter 200. More information regarding the use and operation of the PWM IC U2 may be found in the Unitrode Data Sheet for model number UCC3802N which is hereby incorporated by reference.

The voltage sense signal V_SENSE is generated by the voltage monitor unit 240. The preferred embodiment of the voltage monitor unit 240 is shown in the schematic of FIG. 2C. Voltage in the load monitor unit 240 is regulated by an adjustable shunt regulator U103. The load and source circuits are isolated by the opto-coupler U3. The shunt regulator U103 establishes a reference above which the opto-coupler U3 reduces the voltage sense signal V_SENSE. As V_SENSE decreases, the control unit 230 decreases the power delivered to main transformer T1.

The VBAT signal that drives the opto-coupler U3 is generated in the output stage 220 of the AC Adapter 200. The preferred embodiment of the output stage is depicted in the diagram shown in FIG. 2D. Included in the output stage 220 are the main transformer T1, the output rectifier 270, filtering components C10, and C118, over-voltage protection CR114, and biasing circuitry 280. The transformer T1 illustratively includes a 38-turn primary winding that carries the input signal V_RECT that is generated by the input stage 210. The transformer T1 also includes two 7-turn secondary windings connected in parallel that generate two distinct AC signals that are identical in amplitude. The transformer T1 also includes a third 6-turn primary winding that generates a power voltage that is sent to the biasing circuitry 280. The resulting voltage signal V_CC is used to power the PWM IC U2 shown in FIG. 2B.

Various rectifier designs discussed above, including the Schottky rectifier shown in FIG. 1, may be implemented as the output rectifier 270. However, the preferred embodiment of the output rectifier is a current-driven, zero-voltage switched synchronous rectifier, which is described below. The other components of the AC Adapter 200 described herein and shown in FIGS. 2A–2D represent a preferred embodiment of an AC adapter that uses an output rectifier as described below. Other components and other designs may be used to implement the above described circuitry and the discussion and claims set forth herein shall not be construed to limit the scope of the invention to the circuitry shown.

Figure 3:
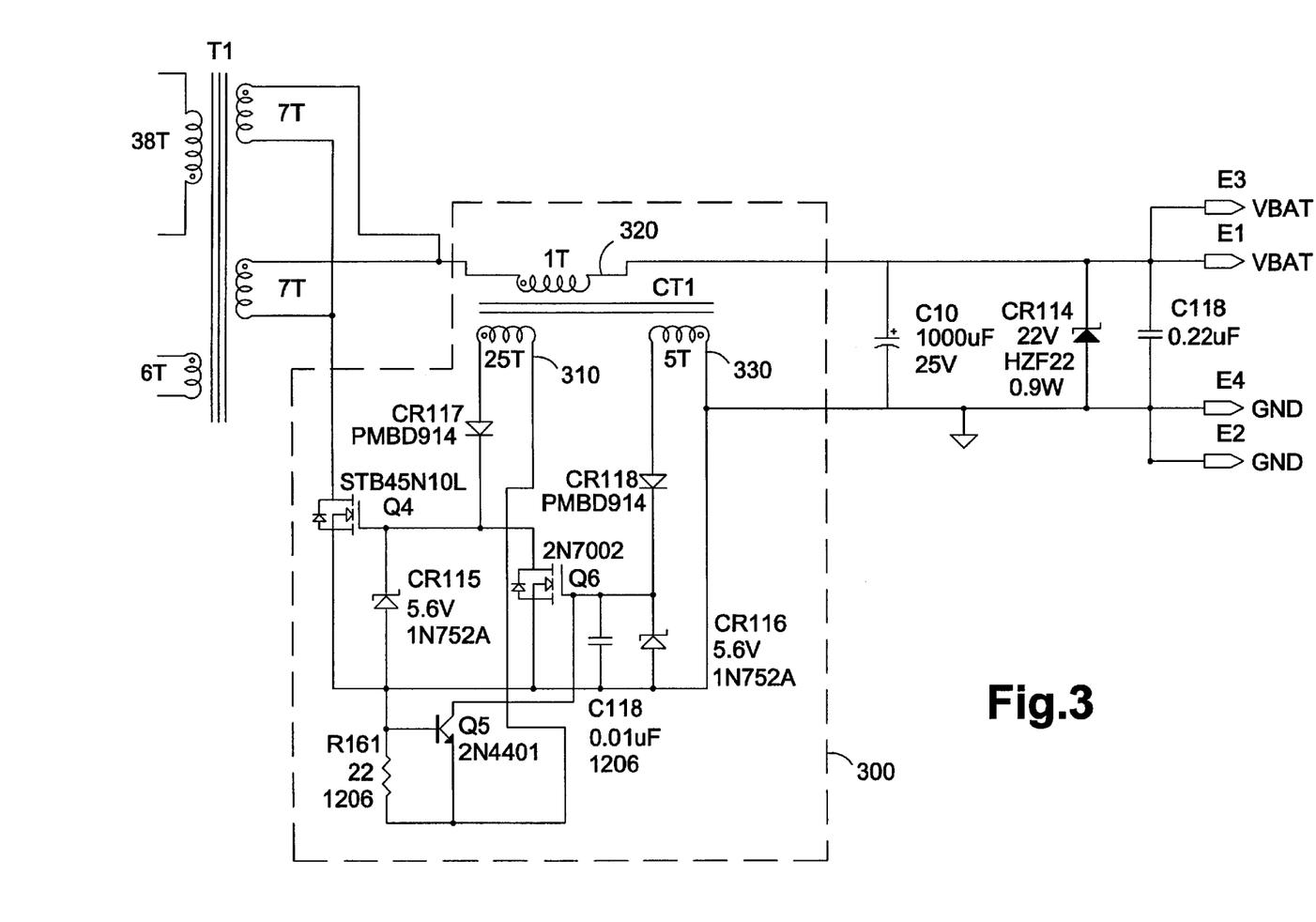
FIG. 3 shows a schematic of a preferred output stage having a current-driven, zero-voltage-switched, synchronous rectifier.

The preferred embodiment of the output rectifier 300 for the AC adapter is shown in FIG. 3. Included in FIG. 3 are the transformer T1 and capacitor filter C10 previously shown in FIGS. 1 and 2D. In this embodiment of the output rectifier 300, the output leads from the transformer T1 are coupled on one end to the primary winding 320 of current transformer CT1 and on the other end to the drain of MOSFET Q4.

Figure 4:
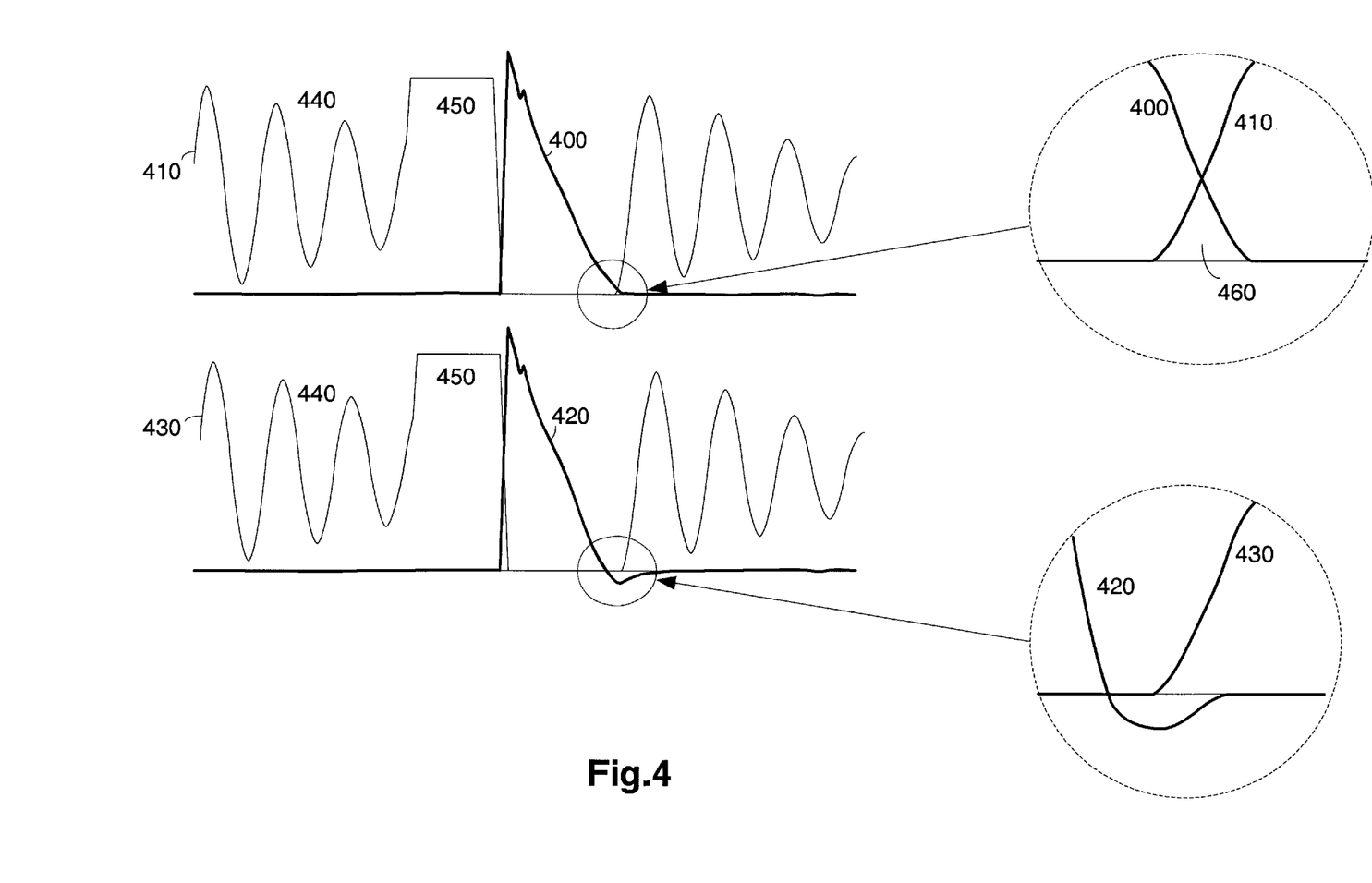
FIG. 4 shows voltage and current plots for a zero-voltage-switched synchronous rectifier and a non zero-voltage-switched synchronous rectifier.

In the preferred embodiment, the voltage from the secondary windings is a gated sinusoid. As discussed above, the PWM IC turns the main transistor switch Q1 on or off with a square wave pulse in varying duty cycles to generate a voltage signal similar to the one shown in FIG. 4. The voltage traces 410 and 430 are sinusoidal 440 for a period of time until the main transistor switch Q1 turns off at which point the voltage goes high 450 until the current in the primary winding of transformer T1 is dissipated. The duration for which the signal is sinusoidal is determined by the duty cycle set by the PWM IC. Increased loads may be detected by the AC adapter as discussed above and the PWM IC may increase the duty cycle to provide more power. As load decrease, the main transistor switch Q1 stays off longer which cause the voltage in the secondary coils of T1 to stay low longer and thereby reduces the power output of the AC Adapter 200. While the duty cycle may change, the frequency with which it is applied remains constant. The key characteristic that must be noted regarding the voltage coming from the secondary windings is that the voltage is bipolar and must be rectified.

Referring again to FIG. 3 and assuming voltage is positive (i.e., potential is higher at the primary coil for CT1 than at the drain for Q4), current will flow generally left to right through the primary coil in the current transformer CT1. Because of the polarity of the secondary winding 330 in the current transformer CT1, current will tend to begin to flow generally left to right, or clockwise, through the secondary winding 330. However, diode CR118 will prevent current flow in this direction and no current will flow. Similarly, current will tend to begin to flow generally right to left, or counterclockwise, through secondary winding 310. Diode CR117 will permit current flow in this direction. This current flow will act to turn transistor Q4 on and permit current flow through transistor Q4. With Q4 on, a voltage and current loop is established between the secondaries of transformer T1 and the rectifier output.

As voltage from the secondaries of transformer T1 drops below the output voltage, current will tend to flow generally right to left through the primary of CT1. The resulting current flow through secondary coil 330 will tend to be right to left, or counterclockwise. Diode CR118 will allow current flow in this direction and as a result, transistor Q6 will turn on. As current flows through transistor Q6, the gate of transistor Q4 is pulled low thereby turning transistor Q4 off. With transistor Q4 off, the voltage and current loop from the secondaries of transformer T1 is interrupted and no current will flow out of the rectifier. By preventing this negative current flow at the output of the rectifier, this effectively rectifies the bipolar voltage coming from the secondary coils of transformer T1. Transistor Q4 may effectively be referred to as the rectifying or switching transistor while transistor Q6 may be referred to as a pull-down transistor.

The Zener diodes CR115 and CR116 are included as voltage regulators limiting the voltage delivered and preventing damage to transistors Q4 and Q6, respectively. Transistor Q5 is included in the preferred embodiment as a means of keeping transistor Q6 off when transistor Q4 is on. When current is flowing through the rectifier, and hence transistor Q4, a small amount of current will flow into the control terminal, or base, of transistor Q5 thereby turning the transistor on. This will, in turn, pull down the control terminal, or gate, to transistor Q6 and ensure that Q6 does not spuriously turn on (and hence turn Q4 off) when transistor Q4 is supposed to be on. In this context, the transistor Q5 may be referred to as a hold-down transistor.

One additional feature offered by the preferred embodiment is the zero-voltage-switching capability which drastically reduces the no-load switching losses that would otherwise be present in transistor Q4. This is depicted graphically in the voltage and current plots shown in FIG. 4. The upper plots are the result of a rectifier without zero voltage switching while the lower plots include zero voltage switching of the rectifying transistor Q4. The voltages and currents in these plots are the drain-source voltage and current, Vds and Ids, appearing across the transistor Q4. The majority of no-load switching losses in the output rectifier occur in this transistor, so discussion of the voltage and current in this transistor are warranted. The voltage traces 410 and 430 exhibit the gated sinusoidal wave shape described above. The current traces 400 and 420 are nominally zero for all time except when Q4 is turned on. Once turned on, the current flowing through Q4 400, 420 will spike upward and then ramp downward until the transistor is switched off again. In a non zero voltage switched configuration, there is a momentary overlap when voltage across the source and drain 400 begins to rise while current 410 is still flowing through the transistor Q4. This is depicted as region 460 in the upper right detail shown in FIG. 4. It is this overlap, when both voltage and current are positive, when power dissipation occurs.

To alleviate this problem, the timing of the rectifier is altered (as shown in the lower right detail of FIG. 4) to hold the transistor Q4 on longer thereby allowing the current flowing through the transistor 420 to ring negative before the transistor voltage 430 begins to rise. By preventing the voltage and current to be positive at the same time, power dissipation is greatly reduced. There will still be some loss in terms of circulating this negative current, but the losses are greatly reduced compared to the non zero voltage switched case.

In the schematic of the preferred embodiment shown in FIG. 3, this delay is created by the inclusion of capacitor C118. As voltage from the secondaries of transformer T1 transitions from positive to negative (and hence causes Q4 to turn off), positive voltage will appear across Zener diode CR116, but voltage will not appear at the gate of transistor Q6 until the capacitor C118 is charged. Transistor Q6 is thus held off longer and transistor Q4 is held on longer by the inclusion of capacitor C118. The energy storage capability of the capacitor creates the necessary delay to reduce switching losses in the rectifying transistor Q4.

The above discussion is meant to be illustrative of the principles and various embodiments of the present invention. Numerous variations and modifications will become apparent to those skilled in the art once the above disclosure is fully appreciated. For example, using other components or altering the circuit to delay the rectifying transistor directly rather than via the pull down transistor Q6 are feasible alternatives. Also, other energy storage elements may be used to effect the delays required for zero voltage switching as described above. It is intended that the following claims be interpreted to embrace all such variations and modifications.

What is claimed is:

1. A rectifying circuit, comprising:
   a current transformer configured to receive a bipolar signal comprising a primary coil, a first secondary coil, and a second secondary coil with a polarity opposite that of the first secondary coil;
   a diode coupled to each of the two secondary coils to allow only positive current flow through the secondary coils;
   a rectifying transistor coupled to the first secondary coil of the current transformer; and
   a pull-down transistor coupled to the second secondary coil;
   wherein when current flows through the first secondary coil, the rectifying transistor is turned on and current flows through the rectifying transistor from the input of the rectifying circuit to the output of the rectifying circuit, and when current flows through the second secondary coil, the pull-down transistor is turned on which turns the rectifying transistor off and current does not flow to the output of the rectifying circuit.

2. The rectifying circuit of claim 1 wherein the transistors are MOSFET transistors.

3. The rectifying circuit of claim 1 further comprising a capacitor coupled in parallel with the control terminal of the pull-down transistor which delays turning the rectifying transistor on and off thereby permitting zero voltage switching of the rectifying transistor.

4. The rectifying circuit of claim 1 further comprising a transistor coupled in parallel with the control terminal of the pull-down transistor wherein when the rectifying transistor is on, the transistor turns on to prevent the pull-down transistor from turning on.

5. The rectifying circuit of claim 1 further comprising a Zener diode placed in parallel with the control terminals of the pull-down and rectifying transistors to regulate voltage and prevent damage to the transistors.

6. A method of rectifying a bipolar signal, comprising:
transmitting the bipolar signal through a current sensing primary coil of a current transformer;
sensing a current generated in a first secondary coil of the current transformer;
sensing a current generated in a second secondary coil of the current transformer that is opposite in polarity to the current generated by the first secondary coil;
turning on a rectifying transistor coupled to the first secondary winding with a positive current in the first secondary winding; and
turning on a pull-down transistor that is coupled to the second secondary winding with a positive current in the second secondary winding;
wherein turning on the rectifying transistor completes a current loop between the rectifier input and output, and wherein turning on the pull-down transistor shorts the control terminal of the rectifying transistor to ground to turn the rectifying transistor off.

7. The method of claim 6, further comprising:
delaying the switching of the rectifying transistor by coupling an energy storage device in parallel with the pull-down transistor.

8. The method of claim 7, wherein:
limiting the current in the first and second secondary coils of the current transformer to positive current flow by placing diodes in series with the first and second secondary coils.

9. The method of claim 7, further comprising:
limiting the voltage that turns on the pull-down and rectifying transistors by placing voltage regulators at the control terminal of the transistors.

10. The method of claim 7, wherein the transistors are metal-oxide-semiconductor field effect transistors.

11. The method of claim 7, further comprising:
preventing the pull-down transistor from turning on when the rectifying transistor is on by coupling a transistor in parallel with the control terminal of the pull-down transistor, wherein when the rectifying transistor is on, the transistor turns on and grounds the control terminal of the pull-down transistor.

12. An AC-DC converter, comprising:
a power transformer;
an integrated circuit controlled switch; and
a rectifier, wherein the rectifier comprises:
a current transformer comprising a primary input winding and two secondary windings, one with the same polarity and one with the opposite polarity as the primary winding;
a switching transistor responsive to current flow from the first secondary winding; and
a pull-down transistor responsive to current flow from the second secondary winding;
wherein when the current flow into the current transformer is positive, the switching transistor switches on to allow current flow out of the rectifier, and
wherein when the current flow into the current transformer is negative, the pull-down transistor switches on which grounds the control terminal of the switching transistor to turn the switching transistor off to prevent current flow out of the rectifier.

13. The AC-DC converter of claim 12, further comprising:
a capacitor coupled in parallel to the control terminal of the pull-down transistor to delay turn-on of the pull-down transistor.

14. The AC-DC converter of claim 12, further comprising:
an energy storage device coupled in parallel to the control terminal of the switching or pull-down transistor to delay turn-off of the switching transistor.

15. The AC-DC converter of claim 12, further comprising:
diodes coupled in series with each of the two secondary coils in the current transformer to permit current flow in one direction only; and
zener diodes coupled in parallel with the pull-down and switching transistors.

16. The AC-DC converter of claim 12, further comprising:
a hold-down transistor configured to ground the control terminal of the pull-down transistor when the switching transistor is on.

17. The AC-DC converter of claim 12, wherein the switching and pull-down transistors are MOSFET transistors.

* * * * *